(12) United States Patent
Ebrahimzadeh

(10) Patent No.: US 12,479,387 B1
(45) Date of Patent: Nov. 25, 2025

(54) AUTOMOTIVE EMERGENCY EVACUATION SYSTEM

(71) Applicant: David J. Ebrahimzadeh, New York, NY (US)

(72) Inventor: David J. Ebrahimzadeh, New York, NY (US)

(*) Notice: Subject to any disclaimer, the term of this patent is extended or adjusted under 35 U.S.C. 154(b) by 0 days.

(21) Appl. No.: 19/174,115

(22) Filed: Apr. 9, 2025

(51) Int. Cl.
*B60R 21/02* (2006.01)
*B60R 21/01* (2006.01)

(52) U.S. Cl.
CPC .............. *B60R 21/02* (2013.01); *B60R 21/01* (2013.01)

(58) Field of Classification Search
CPC ................................ B60R 21/02; B60R 21/01
See application file for complete search history.

(56) References Cited

U.S. PATENT DOCUMENTS

| | | | | |
|---|---|---|---|---|
| 5,152,550 A * | 10/1992 | Hoagland | ............... | B60R 21/33 222/5 |
| 6,418,628 B1 * | 7/2002 | Steingass | ............... | B60R 22/32 30/367 |
| 7,028,874 B2 * | 4/2006 | Lin | ........................... | B25F 1/00 30/367 |
| 7,988,078 B1 * | 8/2011 | Roy | ....................... | A62B 3/005 241/99 |
| 8,869,927 B2 * | 10/2014 | Oosterhuis | ................. | B60J 1/20 180/274 |
| 10,894,175 B1 * | 1/2021 | Hirsius | ................... | A62B 3/005 |
| 11,351,404 B2 * | 6/2022 | Hyde | ....................... | B60R 21/00 |
| 12,214,231 B1 * | 2/2025 | Morgan | ................... | B60R 21/01 |
| 2007/0265753 A1 * | 11/2007 | Cantu | ..................... | B60R 21/01 701/45 |
| 2011/0016993 A1 * | 1/2011 | Suzuki | ................... | G08B 13/04 73/865.8 |
| 2020/0066067 A1 * | 2/2020 | Herman | ................... | G07C 5/08 |

FOREIGN PATENT DOCUMENTS

| | | | | | |
|---|---|---|---|---|---|
| CN | 111976642 A | * | 11/2020 | ............... | B60J 5/00 |
| CN | 112937489 A | * | 6/2021 | ............. | B60R 21/02 |
| CN | 217886822 U | * | 11/2022 | | |
| CN | 117284233 A | * | 12/2023 | ............. | B60R 21/02 |
| CN | 118494392 A | * | 8/2024 | ............. | A62B 3/005 |
| FR | 2898567 A1 | * | 9/2007 | ............. | B60R 21/02 |

OTHER PUBLICATIONS

Translation of CN-117284233-A; Dec. 26, 2021.*

* cited by examiner

*Primary Examiner* — Paul N Dickson
*Assistant Examiner* — Shams Dhanani
(74) *Attorney, Agent, or Firm* — Brian J. Colandreo; Heath M. Sargeant; Holland & Knight LLP

(57) ABSTRACT

An automotive emergency evacuation system for use within a vehicle includes: a glass breaking system positioned proximate an automotive glass panel within a vehicle, wherein the grass breaking system is configured to selectively break the automotive glass panel when activated; and an emergency activation system configured to receive an activation signal from the vehicle and activate the glass breaking system.

24 Claims, 4 Drawing Sheets

AUTOMOTIVE EMERGENCY EVACUATION SYSTEM

TECHNICAL FIELD

This disclosure relates to automotive emergency evacuation systems and, more particularly, to automotive emergency evacuation systems that shatter glass panels.

BACKGROUND

When vehicle windows stop working after an accident, it can create serious safety risks, particularly if occupants become trapped inside. In many modern vehicles, power windows rely entirely on the car's electrical system. During a crash, this system can be damaged, disconnected, or automatically shut off for safety, rendering the windows inoperable. If the doors are also jammed—a common result of side impacts or rollovers—then the windows may be the only possible escape route. Without the ability to open them, occupants can be left with no easy way out.

This issue becomes especially dangerous in life-threatening situations like vehicle fires or water submersion, where every second counts. In such cases, being unable to open a window can mean the difference between escape and entrapment. Emergency responders may have to break the windows to get people out, but this process takes time and carries its own risks, such as glass-related injuries.

The psychological toll of being stuck inside a car with no way out can also be severe. Panic, anxiety, or claustrophobia may set in, which can impair a person's ability to think clearly and take effective action. This is particularly dangerous if the vehicle cabin is filling with smoke, water, or fumes. In some scenarios, like when a driver is incapacitated and children or pets are inside, the inability to open a window becomes even more critical.

To mitigate these risks, safety experts recommend keeping a glass-breaking tool within easy reach and encouraging vehicle manufacturers to implement emergency release mechanisms or manual overrides for windows. Public awareness and training on how to react in these situations can also play a crucial role in saving lives.

SUMMARY OF DISCLOSURE

In one implementation, an automotive emergency evacuation system for use within a vehicle includes: a glass breaking system positioned proximate an automotive glass panel within a vehicle, wherein the grass breaking system is configured to selectively break the automotive glass panel when activated; and an emergency activation system configured to receive an activation signal from the vehicle and activate the glass breaking system.

One or more of the following features may be included. The glass breaking system may include: a displaceable contactor assembly configured to engage and break the automotive glass panel. The glass breaking system may further include: an actuator assembly coupled to the emergency activation system and configured to displace the displaceable contactor assembly so that the displaceable contactor assembly engages the automotive glass panel. The actuator assembly may be an electromechanical-based actuator assembly. The electromechanical-based actuator assembly may include: a solenoid assembly configured to displace the displaceable contactor assembly so that the displaceable contactor assembly engages the automotive glass panel. The actuator assembly may be a charge-based actuator assembly. The charge-based actuator assembly may include: an explosive charge system configured to displace the displaceable contactor assembly so that the displaceable contactor assembly engages the automotive glass panel. At least a portion of the automotive emergency evacuation system may be positionable within a door of the vehicle. At least a portion of the automotive emergency evacuation system may be positionable within a pillar of the vehicle. At least a portion of the automotive emergency evacuation system may be a portion of a window regulator of the vehicle. The automotive glass panel may be a door glass panel of the vehicle. The activation signal may be an electrical activation signal. The electrical activation signal may be provided by the vehicle in the event of an emergency situation concerning the vehicle. The electrical activation signal may be provided by the vehicle in the event of an accident concerning the vehicle.

In another implementation, an automotive emergency evacuation system for use within a vehicle includes: a glass breaking system positioned proximate an automotive glass panel within a vehicle, wherein the grass breaking system is configured to selectively break the automotive glass panel when activated; and an emergency activation system configured to receive an activation signal from the vehicle and activate the glass breaking system, wherein the glass breaking system includes: a displaceable contactor assembly configured to engage and break the automotive glass panel, and an electromechanical-based actuator assembly coupled to the emergency activation system and configured to displace the displaceable contactor assembly so that the displaceable contactor assembly engages the automotive glass panel.

One or more of the following features may be included. The electromechanical-based actuator assembly may include: a solenoid assembly configured to displace the displaceable contactor assembly so that the displaceable contactor assembly engages the automotive glass panel. At least a portion of the automotive emergency evacuation system may be positionable within a door of the vehicle. At least a portion of the automotive emergency evacuation system may be positionable within a pillar of the vehicle. At least a portion of the automotive emergency evacuation system may be a portion of a window regulator of the vehicle. The activation signal may be an electrical activation signal. The electrical activation signal may be provided by the vehicle in the event of an emergency situation concerning the vehicle. The electrical activation signal may be provided by the vehicle in the event of an accident concerning the vehicle.

In another implementation, an automotive emergency evacuation system for use within a vehicle includes: a glass breaking system positioned proximate an automotive glass panel within a vehicle, wherein the grass breaking system is configured to selectively break the automotive glass panel when activated; and an emergency activation system configured to receive an activation signal from the vehicle and activate the glass breaking system, wherein the glass breaking system includes: a displaceable contactor assembly configured to engage and break the automotive glass panel, and a charge-based actuator assembly coupled to the emergency activation system and configured to displace the displaceable contactor assembly so that the displaceable contactor assembly engages the automotive glass panel.

One or more of the following features may be included. The charge-based actuator assembly may include: an explosive charge system configured to displace the displaceable contactor assembly so that the displaceable contactor assembly engages the automotive glass panel. At least a portion of the automotive emergency evacuation system may be positionable within a door of the vehicle. At least a portion of the automotive emergency evacuation system may be positionable within a pillar of the vehicle. At least a portion of the automotive emergency evacuation system may be a portion of a window regulator of the vehicle. The activation signal may be an electrical activation signal. The electrical activation signal may be provided by the vehicle in the event of an emergency situation concerning the vehicle. The electrical activation signal may be provided by the vehicle in the event of an accident concerning the vehicle.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
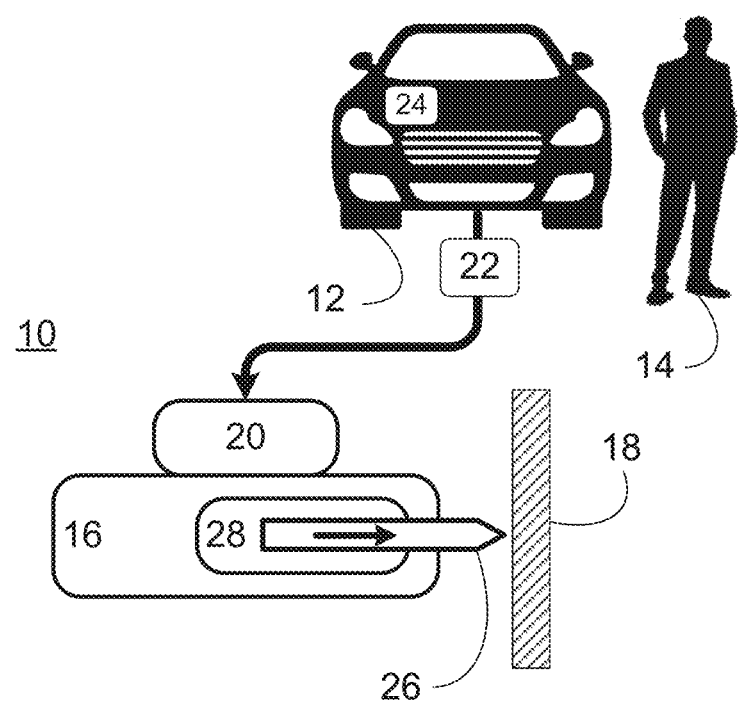
FIG. 1 is a diagrammatic view of an automotive emergency evacuation system according to an embodiment of the present disclosure.

Referring to FIG. 1, there is shown an automotive emergency evacuation system (e.g., automotive emergency evacuation system 10) for use within a vehicle (e.g., vehicle 12). As will be discussed below in greater detail, the automotive emergency evacuation system (e.g., automotive emergency evacuation system 10) may interface with the vehicle (e.g., vehicle 12) to ascertain the operating condition of the same.

If the automotive emergency evacuation system (e.g., automotive emergency evacuation system 10) determines that the vehicle (e.g., vehicle 12) is in a dangerous condition (e.g., an emergency situation and/or an accident), the automotive emergency evacuation system (e.g., automotive emergency evacuation system 10) may be configured to shatter/break one or more windows within the vehicle (e.g., vehicle 12) to allow the occupants (e.g., driver 14) of the vehicle to exit the same and extricate themselves from the dangerous condition.

The automotive emergency evacuation system (e.g., automotive emergency evacuation system 10) may include a glass breaking system (e.g., glass breaking system 16) positioned proximate an automotive glass panel (e.g., automotive glass panel 18) within a vehicle (e.g., vehicle 12).

The glass breaking system (e.g., glass breaking system 16) may be configured to selectively break the automotive glass panel (e.g., automotive glass panel 18) when activated. An example of the automotive glass panel (e.g., automotive glass panel 18) may include but is not limited to a door glass panel of the vehicle (e.g., vehicle 12).

Automotive glass is designed to ensure both safety and durability, with two primary types used in vehicles: tempered glass and laminated glass. Tempered glass is commonly used in side windows (door glass) and rear windshields. It's made by heating the glass to a high temperature (about 620° C. or 1,148° F.) and then rapidly cooling it. This process creates tension on the inside and compression on the outside, making the glass much stronger than regular glass. When tempered glass breaks, it shatters into small, blunt pieces rather than sharp shards, which reduces the risk of injury. This type of glass is ideal for windows that need to break safely in the event of an accident, such as side windows or rear windshields, which are more likely to be impacted during a crash or by debris.

On the other hand, laminated glass is used in the windshield of a vehicle. It consists of two layers of glass with a plastic interlayer, typically made of polyvinyl butyral (PVB), sandwiched in between. The layers are fused together under heat and pressure, resulting in a strong, flexible sheet of glass. When laminated glass breaks, it tends to crack but does not shatter. The plastic interlayer holds the cracked pieces together, preventing them from flying out and ensuring the windshield remains intact, which is crucial for occupant protection and visibility. Unlike tempered glass, laminated glass can sometimes be repaired if it's chipped, making it a preferred choice for windshields where both safety and the ability to maintain structural integrity are important.

In summary, tempered glass is designed to shatter safely into small pieces and is used in side and rear windows, while laminated glass is used in windshields because it offers more strength and prevents the glass from shattering, providing both safety and the ability to be repaired.

The automotive emergency evacuation system (e.g., automotive emergency evacuation system 10) may include an emergency activation system (e.g., emergency activation system 20) configured to receive an activation signal (e.g., activation signal 22) from the vehicle (e.g., vehicle 12) and activate the glass breaking system (e.g., glass breaking system 16).

The activation signal (e.g., activation signal 22) may be an electrical activation signal (e.g., activation signal 22), wherein this activation signal (e.g., activation signal 22) may result in automotive emergency evacuation system 10 shattering one or more windows (e.g., automotive glass panel 18) of vehicle 12, thus enabling the occupants (e.g., driver 14) of vehicle 12 to exit vehicle 12 regardless of the operability of the windows and/or doors of vehicle 12.

For example, the electrical activation signal (e.g., activation signal 22) may be provided by the vehicle (e.g., vehicle 12) in the event of an emergency situation (e.g., a fire event, a rollover event, an engine failure event) concerning the vehicle (e.g., vehicle 12). Such an emergency situation may be sensed by various sensors (e.g., sensor 24) positioned within vehicle 12. For example, an orientation sensor (e.g., sensor 24) may be configured to sense the orientation of vehicle 12 (e.g., upside down versus right-side up); a thermal/smoke sensor (e.g., sensor 24) may be configured to sense heat or smoke inside vehicle 12; an engine sensor (e.g., sensor 24) may be configured to sense an engine failure event; etc. Accordingly and in the event of such an emergency situation occurring, this electrical activation signal (e.g., activation signal 22) may be automatically provided to the emergency activation system (e.g., emergency activation system 20) to enable the shattering of one or more windows (e.g., automotive glass panel 18) of vehicle 12 to allow its occupants (e.g., driver 14) to exit regardless of the operability of the windows and/or doors of vehicle 12.

Additionally, the electrical activation signal (e.g., activation signal 22) may be provided by the vehicle (e.g., vehicle 12) in the event of an accident concerning the vehicle (e.g., vehicle 12). Accordingly and in the event of such an accident situation occurring (e.g., a high-G deceleration event or an airbag deployment concerning vehicle 12), this electrical activation signal (e.g., activation signal 22) may be automatically provided to the emergency activation system (e.g., emergency activation system 20) to enable the shattering of one or more windows of vehicle 12 to allow its occupants (e.g., driver 14) to exit regardless of the operability of the windows and/or doors of vehicle 12

The glass breaking system (e.g., glass breaking system 16) may include a displaceable contactor assembly (e.g., displaceable contactor assembly 26) configured to engage and break the automotive glass panel (e.g., automotive glass panel 18). Specifically and upon receiving an activation signal (e.g., activation signal 22) from the vehicle (e.g., vehicle 12), the displaceable contactor assembly (e.g., displaceable contactor assembly 26) may be displaced to engage and break the automotive glass panel (e.g., automotive glass panel 18).

The displaceable contactor assembly (e.g., displaceable contactor assembly 26) designed to shatter glass (e.g., automotive glass panel 18) may use a mechanical striker or impact pin (e.g., a hardened steel/tungsten pin) that is driven by an actuator with enough force to break the glass upon contact. As will be discussed below, one type of actuator is a charge-based explosive actuator that rapidly propels displaceable contactor assembly 26 toward automotive glass panel 18. When triggered (usually by an electrical signal), the explosive charge produces a sudden burst of energy that propels displaceable contactor assembly 26 forward at high speed. Additionally/alternatively, another type of actuator utilizes an electromechanical actuator that drives displaceable contactor assembly 26 toward automotive glass panel 18. When triggered (usually by an electrical signal), the electromechanical actuator drives displaceable contactor assembly 26 forward at high speed. The tip of the displaceable contactor assembly (e.g., displaceable contactor assembly 26) may be engineered to concentrate impact energy on a small area, which is especially effective for shattering tempered glass, as it is designed to break into small, blunt pieces upon sharp impact.

Actuator Assembly

As mentioned above, the glass breaking system (e.g., glass breaking system 16) may further include an actuator assembly (e.g., actuator assembly 28) coupled to the emergency activation system (e.g., emergency activation system 20) and configured to displace the displaceable contactor assembly (e.g., displaceable contactor assembly 26) so that the displaceable contactor assembly (e.g., displaceable contactor assembly 26) engages the automotive glass panel (e.g., automotive glass panel 18).

The actuator assembly (e.g., actuator assembly 28) may be an electromechanical-based actuator assembly (e.g., actuator assembly 28). For example, the electromechanical-based actuator assembly (e.g., actuator assembly 28) may include a solenoid assembly configured to displace the displaceable contactor assembly (e.g., displaceable contactor assembly 26) so that the displaceable contactor assembly (e.g., displaceable contactor assembly 26) engages the automotive glass panel (e.g., automotive glass panel 18).

A solenoid assembly is an electromechanical device that converts electrical energy into linear motion using a magnetic field. At its core, a solenoid assembly consists of a coil of wire wrapped around a movable metal core or plunger. When electric current flows through the coil, it generates a magnetic field, which pulls the metal plunger into the center of the coil.

This movement of the plunger can be used to displace or move an object (e.g., displaceable contactor assembly 26). For example, when the solenoid assembly is activated, the plunger can push or pull a mechanical component, such as a latch, valve, or lever. When the current stops, a spring usually returns the plunger to its original position.

Solenoid assemblies may be used in applications where fast, simple, on-off linear motion is needed. In vehicles, they might control fuel injectors, door locks, or starter motors. In other systems, they may be found in vending machines (to release a product), printers (to move paper or ink heads), and industrial machinery (to control fluid or air flow via valves).

The actuator assembly (e.g., actuator assembly 28) may be a charge-based actuator assembly (e.g., actuator assembly 28). For example, the charge-based actuator assembly (e.g., actuator assembly 28) may include an explosive charge configured to displace the displaceable contactor assembly (e.g., displaceable contactor assembly 26) so that the displaceable contactor assembly (e.g., displaceable contactor assembly 26) engages the automotive glass panel (e.g., automotive glass panel 18).

A charge-based actuator assembly (e.g., actuator assembly 28) is a type of pyrotechnic device that uses a small, controlled explosive charge to produce rapid mechanical motion. When triggered, typically by an electrical signal, the explosive material inside the actuator ignites and generates a sudden burst of gas pressure or a mechanical shockwave. This energy is then used to perform a quick, forceful action such as driving a piston, releasing a latch, severing a component or displacing the displaceable contactor assembly (e.g., displaceable contactor assembly 26). Explosive charge actuators are commonly found in automotive safety systems, such as airbag inflators and seatbelt pretensioners, where immediate response during a crash is critical. They are also used in aerospace and military applications for tasks like separating components, deploying parachutes, or initiating emergency mechanisms. These actuators are valued for their speed, reliability, and ability to function in extreme conditions, but they are typically single-use and must be replaced after activation due to the nature of the explosion.

Location

Figure 2:
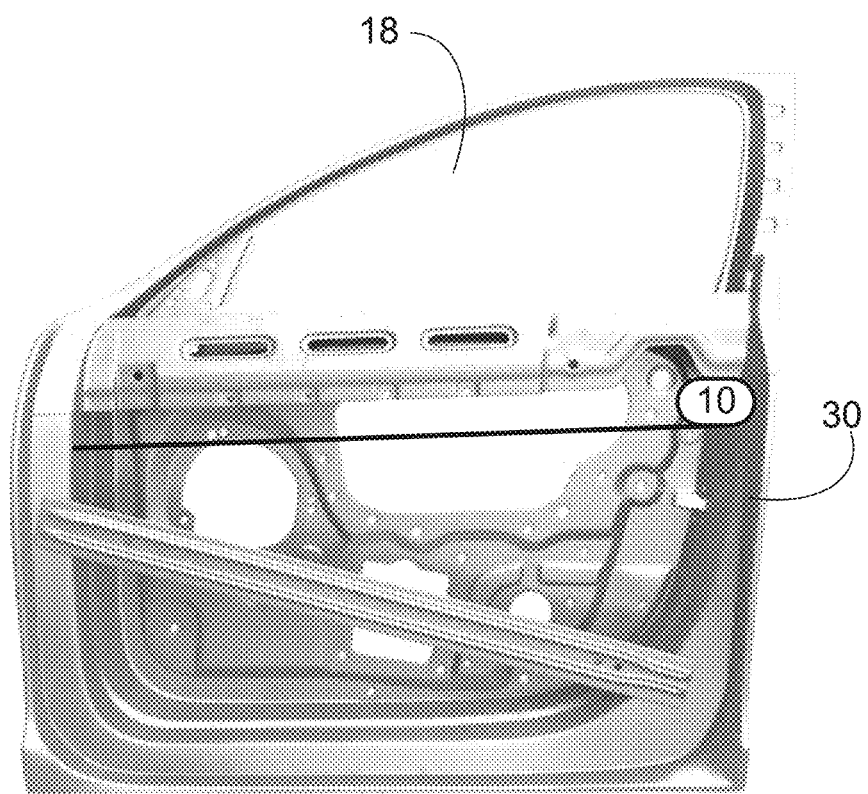
FIGS. 2-4 are images of various mounting locations for the automotive emergency evacuation system of FIG. 1 according to an embodiment of the present disclosure.

At least a portion of the automotive emergency evacuation system (e.g., automotive emergency evacuation system 10) may be positionable within a door (e.g., door 30) of the vehicle (e.g., vehicle 12), as shown in FIG. 2. For example, the automotive emergency evacuation system (e.g., automotive emergency evacuation system 10) may be mounted within the door (e.g., door 30) of vehicle 12 so that displaceable contactor assembly 26 (when displaced by actuator assembly 28) makes contact with the automotive glass panel (e.g., automotive glass panel 18) to effectuate the breaking of the same in the event of an emergency situation and/or an accident.

Figure 3:
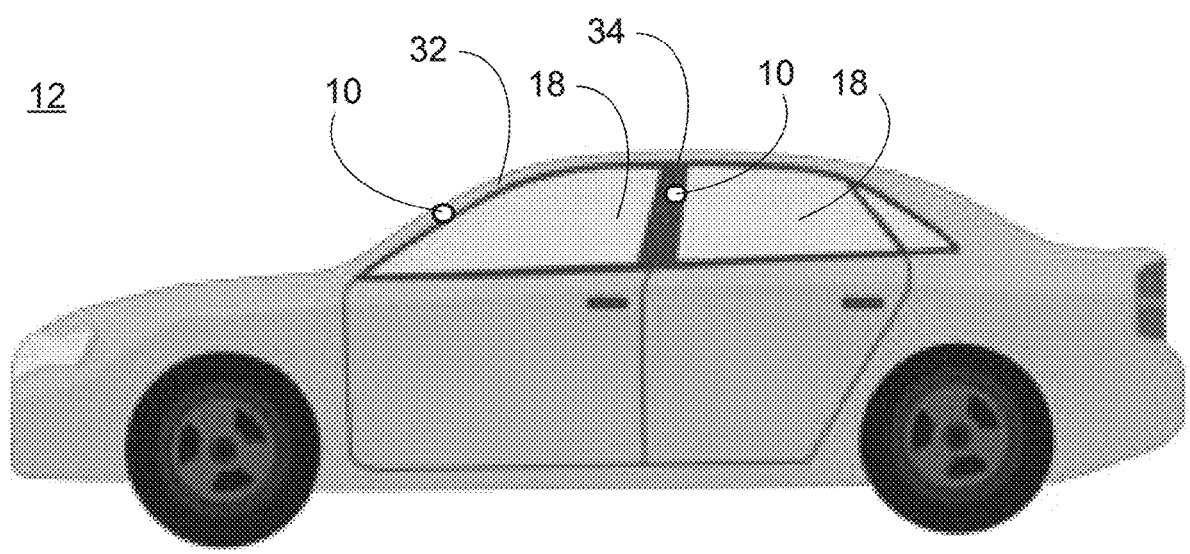

At least a portion of the automotive emergency evacuation system (e.g., automotive emergency evacuation system 10) may be positionable within a pillar (e.g., pillars 32, 34) of the vehicle (e.g., vehicle 12), as shown in FIG. 3. For example, the automotive emergency evacuation system (e.g., automotive emergency evacuation system 10) may be positioned within the A-pillar (e.g., A-pillar 32) or B-pillar (e.g., B-pillar 34) of vehicle 12 so that displaceable contactor assembly 26 makes contact with the automotive glass panel (e.g., automotive glass panel 18) to effectuate the breaking of the same in the event of an emergency situation and/or an accident.

In automotive design, the A-pillar (e.g., A-pillar 32) and B-pillar (e.g., B-pillar 34) are structural components that help support the roof and frame the windows of vehicle 12. The A-pillar (e.g., A-pillar 32) is the front-most vertical support on either side of the windshield. It connects the roof to the body of the car near the dashboard and plays a crucial role in the vehicle's structural integrity, especially during rollovers. The A-pillar (e.g., A-pillar 32) also often houses important components such as airbags, wiring, or sensors in modern vehicles. Just behind the A-pillar (e.g., A-pillar 32) is the B-pillar (e.g., B-pillar 34), which is located between the front and rear doors on most cars. The B-pillar (e.g., B-pillar 34) supports the roof and serves as an anchor point for the front seatbelts. It is also essential for protecting occupants during side-impact collisions, helping to maintain the rigidity of the passenger compartment. These pillars are part of the vehicle's safety cage and contribute significantly to both crash protection and overall body strength.

Figure 4:
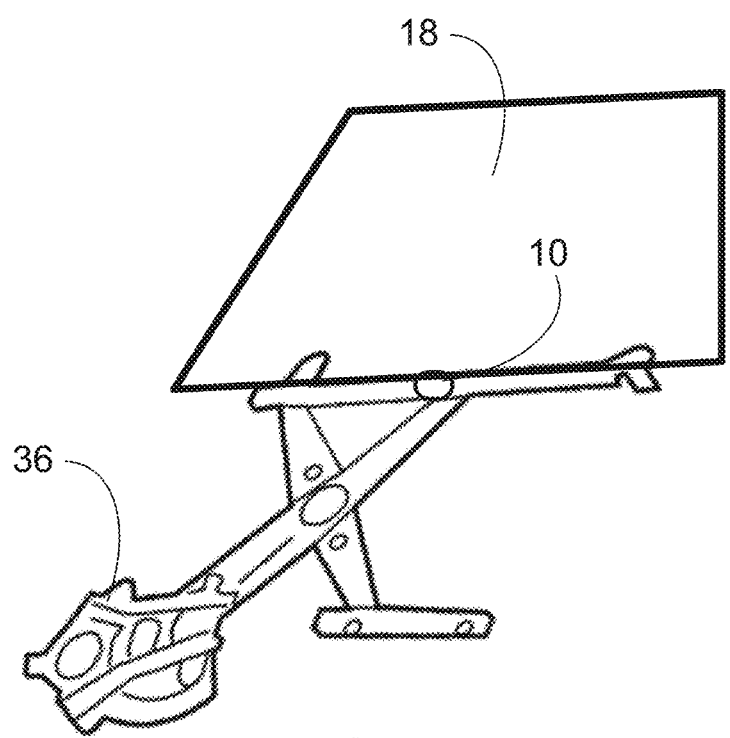

At least a portion of the automotive emergency evacuation system (e.g., automotive emergency evacuation system 10) may be a portion of a window regulator (e.g., window regulator 36) of the vehicle (e.g., vehicle 12), as shown in FIG. 4. For example, the automotive emergency evacuation system (e.g., automotive emergency evacuation system 10) may be attached to (or a portion of) the window regulator within the door of vehicle 12 and positioned in a manner so that the displaceable contactor assembly 26 makes contact with the automotive glass panel (e.g., automotive glass panel 18) to effectuate the breaking of the same in the event of an emergency situation and/or an accident.

A window regulator (e.g., window regulator 36) is an essential mechanical component within a vehicle's door that allows the window glass (e.g., automotive glass panel 18) to move up and down. It plays a crucial role in ensuring the proper operation of your car's windows, whether you're using a manual window crank or an electric switch. In manual systems, the window regulator is connected to a hand crank that, when turned, activates a series of gears or a scissor-like mechanism to physically lift or lower the glass. On the other hand and in vehicles equipped with power windows, the regulator (e.g., window regulator 36) is integrated with a small electric motor that responds to the press of a switch, driving the mechanism that moves the window smoothly and efficiently. The regulator (e.g., window regulator 36) itself is typically mounted inside the door frame and is often made up of tracks, cables, gears, and sometimes pulleys, depending on the design. Some use a scissor-style system with arms that pivot and push the window up, while others use a cable-driven mechanism that pulls the window along a track.

General

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. An automotive emergency evacuation system for use within a vehicle comprising:
    a glass breaking system positioned proximate an automotive glass panel within a vehicle, wherein the grass breaking system is configured to selectively break the automotive glass panel when activated, wherein the glass breaking system includes:
        a displaceable contactor assembly configured to engage and break the automotive glass panel, and
        an actuator assembly coupled to the emergency activation system and configured to displace the displaceable contactor assembly so that the displaceable contactor assembly engages the automotive glass panel, wherein the actuator assembly is an electro-mechanical-based actuator assembly that includes a solenoid assembly configured to displace the displaceable contactor assembly so that the displaceable contactor assembly engages the automotive glass panel; and
    an emergency activation system configured to receive an activation signal from the vehicle and activate the glass breaking system.

2. The automotive emergency evacuation system of claim 1 wherein the actuator assembly is a charge-based actuator assembly.

3. The automotive emergency evacuation system of claim 2 wherein the charge-based actuator assembly includes:
    an explosive charge system configured to displace the displaceable contactor assembly so that the displaceable contactor assembly engages the automotive glass panel.

4. The automotive emergency evacuation system of claim 1 wherein at least a portion of the automotive emergency evacuation system is positionable within a door of the vehicle.

5. The automotive emergency evacuation system of claim 1 wherein at least a portion of the automotive emergency evacuation system is positionable within a pillar of the vehicle.

6. The automotive emergency evacuation system of claim 1 wherein at least a portion of the automotive emergency evacuation system is a portion of a window regulator of the vehicle.

7. The automotive emergency evacuation system of claim 1 wherein the automotive glass panel is a door glass panel of the vehicle.

8. The automotive emergency evacuation system of claim 1 wherein the activation signal is an electrical activation signal.

9. The automotive emergency evacuation system of claim 8 wherein the electrical activation signal is provided by the vehicle in the event of an emergency situation concerning the vehicle.

10. The automotive emergency evacuation system of claim 8 wherein the electrical activation signal is provided by the vehicle in the event of an accident concerning the vehicle.

11. An automotive emergency evacuation system for use within a vehicle comprising:
- a glass breaking system positioned proximate an automotive glass panel within a vehicle, wherein the grass breaking system is configured to selectively break the automotive glass panel when activated; and
- an emergency activation system configured to receive an activation signal from the vehicle and activate the glass breaking system, wherein the glass breaking system includes:
  - a displaceable contactor assembly configured to engage and break the automotive glass panel, and
  - an electromechanical-based actuator assembly coupled to the emergency activation system that includes a solenoid assembly configured to displace the displaceable contactor assembly so that the displaceable contactor assembly engages the automotive glass panel.

12. The automotive emergency evacuation system of claim 11 wherein at least a portion of the automotive emergency evacuation system is positionable within a door of the vehicle.

13. The automotive emergency evacuation system of claim 11 wherein at least a portion of the automotive emergency evacuation system is positionable within a pillar of the vehicle.

14. The automotive emergency evacuation system of claim 11 wherein at least a portion of the automotive emergency evacuation system is a portion of a window regulator of the vehicle.

15. The automotive emergency evacuation system of claim 11 wherein the activation signal is an electrical activation signal.

16. The automotive emergency evacuation system of claim 15 wherein the electrical activation signal is provided by the vehicle in the event of an emergency situation concerning the vehicle.

17. The automotive emergency evacuation system of claim 15 wherein the electrical activation signal is provided by the vehicle in the event of an accident concerning the vehicle.

18. An automotive emergency evacuation system for use within a vehicle comprising:
- a glass breaking system positioned proximate an automotive glass panel within a vehicle, wherein the grass breaking system is configured to selectively break the automotive glass panel when activated; and
- an emergency activation system configured to receive an activation signal from the vehicle and activate the glass breaking system, wherein the glass breaking system includes:
  - a displaceable contactor assembly configured to engage and break the automotive glass panel, and
  - a charge-based actuator assembly coupled to the emergency activation system and configured to displace the displaceable contactor assembly so that the displaceable contactor assembly engages the automotive glass panel;
- wherein at least a portion of the automotive emergency evacuation system is a portion of a window regulator of the vehicle.

19. The automotive emergency evacuation system of claim 18 wherein the charge-based actuator assembly includes:
- an explosive charge system configured to displace the displaceable contactor assembly so that the displaceable contactor assembly engages the automotive glass panel.

20. The automotive emergency evacuation system of claim 18 wherein at least a portion of the automotive emergency evacuation system is positionable within a door of the vehicle.

21. The automotive emergency evacuation system of claim 18 wherein at least a portion of the automotive emergency evacuation system is positionable within a pillar of the vehicle.

22. The automotive emergency evacuation system of claim 18 wherein the activation signal is an electrical activation signal.

23. The automotive emergency evacuation system of claim 22 wherein the electrical activation signal is provided by the vehicle in the event of an emergency situation concerning the vehicle.

24. The automotive emergency evacuation system of claim 22 wherein the electrical activation signal is provided by the vehicle in the event of an accident concerning the vehicle.

* * * * *